United States Patent

D'Amato et al.

[15] 3,683,282

[45] Aug. 8, 1972

[54] PROCESS AND AUTOMATIC DEVICE FOR SIGNAL-TO-NOISE RATIO MEASUREMENT OF A TELEVISION SIGNAL

[72] Inventors: Paolo D'Amato, p.zza Pittagora 18; Gastone Zetti, Curso Agnelli 42, both of Torino, Italy

[22] Filed: Jan. 28, 1970

[21] Appl. No.: 6,488

[30] Foreign Application Priority Data

Feb. 4, 1969 Italy....................50439 A/69

[52] U.S. Cl.........325/363, 178/DIG. 4, 178/DIG. 12, 324/57 N, 325/133

[51] Int. Cl...........................H04n 5/52, G01r 27/00

[58] Field of Search.....178/DIG. 1, DIG. 12, DIG. 4; 325/363, 133; 324/57 N, 57 NB

[56] References Cited

UNITED STATES PATENTS

| | | | |
|---|---|---|---|
| 2,959,672 | 11/1960 | Maise | 325/363 |
| 3,302,116 | 1/1967 | Free | 325/363 |
| 2,694,142 | 11/1954 | Laidig | 325/363 |
| 2,868,970 | 1/1959 | Aitken | 325/363 |
| 2,942,062 | 6/1960 | Macouski | 178/6 NS UX |
| 2,988,693 | 6/1961 | Billig et al. | 325/363 |
| 3,486,112 | 12/1969 | Bayer | 325/363 |

*Primary Examiner*—Richard Murray
*Assistant Examiner*—Peter M. Pecori
*Attorney*—Clario Ceccon

[57] ABSTRACT

Process and device for automatically measuring the signal-to-noise ratio of a television signal wherein the noise is extracted from the transmitted television signal during the blanking interval, i.e., the interval marked by the absence of a video signal. The noise is subjected to amplification and successive attenuation of pre-selected values changed step by step until the noise power is caused to be equal to a pre-selected threshold value. The proper circuitry logic automatically varies the attenuation and computes the signal-to-noise ratio of said television signal from the final attenuation value.

10 Claims, 3 Drawing Figures

PROCESS AND AUTOMATIC DEVICE FOR SIGNAL-TO-NOISE RATIO MEASUREMENT OF A TELEVISION SIGNAL

BACKGROUND OF THE INVENTION

The present invention relates to a process and automatic device for signal-to-noise ratio measurement of television signal.

SUMMARY OF THE INVENTION

The prime object of the present invention is to measure the quality of television transmission and reception in a simple, efficient and automatic manner during the periods of normal programs transmission.

The process according to the present invention comprises extracting the noise from the transmitted signal during one or several time intervals in which useful video signal is absent, amplifying the noise, obtaining a signal proportional to noise power, comparing said signal proportional to noise power with a threshold level and making this signal equal to said threshold, switching on or off pre-arranged value attenuations and computing the value of the introduced attenuation.

In a preferred embodiment of the invention one starts by introducing an attenuation surely higher than the equilibrium one, then the equilibrium is reached by successively switching off some attenuators till said threshold level is reached; alternatively we start from any attenuation value and attenuators are switched on or off so as to approach the threshold level by successive approximations to the nearest value above, or below. These interventions to change attenuation occur cyclically and automatically in each field scanning interval.

The preferred embodiment of the device of the present invention comprises at least a group of attenuators connectible by means of appropriate fast-acting relays, arranged in cascade and interconnected by at least a wide-band amplifier followed by: a square-law detector, a gate circuit extracting the noise from the signal portions predetermined for extraction, an integrator circuit set to zero at each field scanning interval, and a comparator for comparing the integrated noise power to the preselected threshold. The output of said comparator drives the logic circuit which commands the automatic step by step positioning of the attenuators till said threshold is obtained within the bounds of the pre-established approximation.

The final state of said logic circuit, viz. counters, defines the signal/noise ratio.

The device, preferably, comprises two groups of attenuators, or rather a group corresponding to the tens and a group corresponding to the units, as will be further explained below, each group followed by a wide-band amplifier. To compute the signal-to-noise ratio it is necessary to keep into account the video signal level. Therefore, preferably the circuit comprises a control circuit for automatic adjustment of the gain of one of said wide-band amplifiers according to the level of the video signal introduced in the device. The intervals in the transmitted signal best suited to the extraction of the noise are those which correspond to the vertical blanking interval and/or to the intervals in which the synchronizing signal of each line has the peak value. Experiments have shown that satisfactory results are obtained by extracting noise on four intervals for each field scanning interval; extraction length may be, by way of example, 40 microseconds at each time.

The gate-circuit established the extraction instant, the extraction length and the number of extractions per field scan. The device is made so as to have a lower and upper end scale value. It has been found that measurements of particular interest are in the interval between 19 dB and 69 dB; hence, for values lower than 19 dB and values higher than 69 dB, the device furnishes a fixed reading.

BRIEF DESCRIPTION OF THE DRAWINGS

While the specification concludes with claims particularly pointing out and distinctly claiming the subject matter regarded as our invention, a preferred embodiment of the invention is disclosed in the following detailed description taken in conjunction with the accompanying drawings in which:

DESCRIPTION OF THE PREFERRED EMBODIMENT

Figure 1:
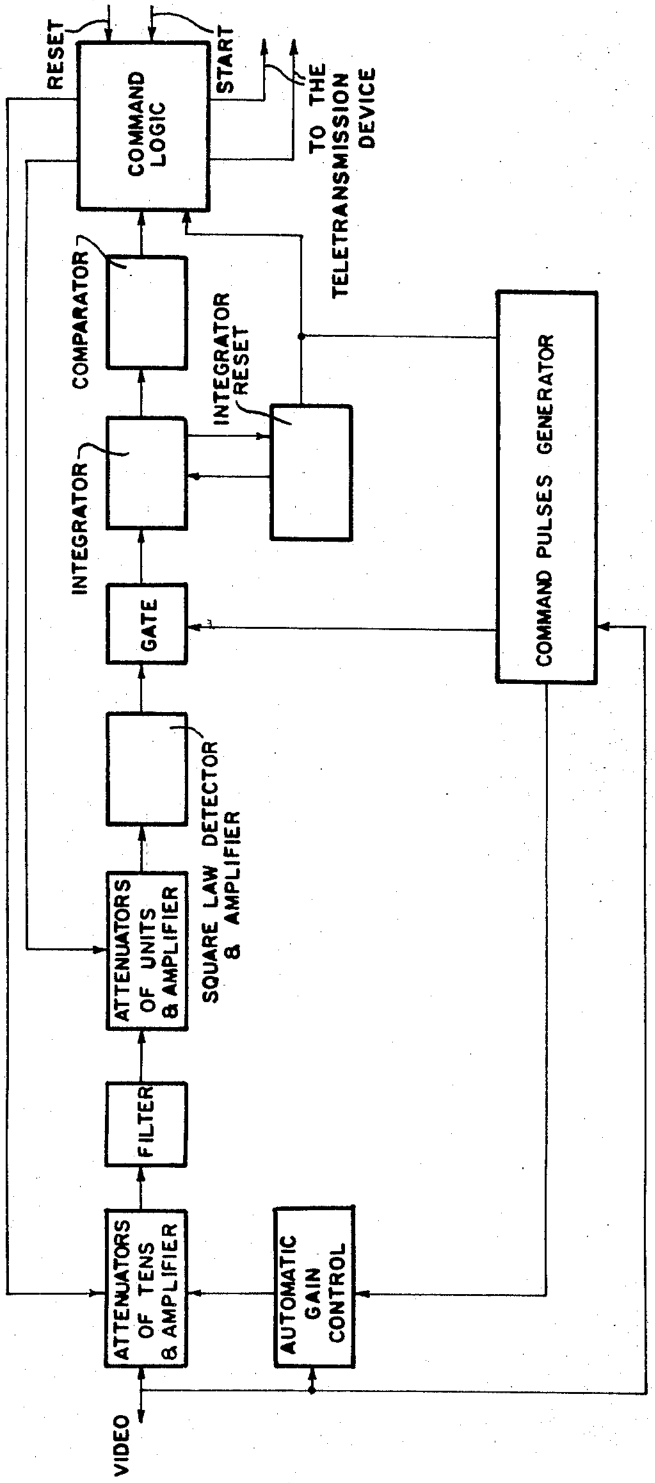
FIG. 1 is a block-diagram of the device according to the invention.

Referring now to FIG. 1, an input terminal 1, connects the video signal transmission system to: a first group of attenuators 2, accompanied by an amplifier; an automatic gain control system 3; and a command-pulse generator 4.

First group of attenuators 2 with the respective amplifier is serially connected to a filter 5, followed by a second group of attenuators 6 provided with amplifier followed by a square-law detector 7, also provided with an associated amplifier.

The output of the square-law detector 7 is fed to a gate 8 which is connected to an integrator 9 which in turn is serially connected to a comparator 10. Said comparator drives the command logic 11 which commands the two attenuator groups contained in 2 and 6.

The output of said command-pulse generator 4 is connected to the automatic-gain-control system 3, to the gate 8, and to an arrangement 12 for setting to zero integrator 9, and to the command logic 11. The output from the logic group 11 may be connected to a data transmission system or to a display device. (Said connections not shown.)

The command logic 11 has associated therewith a START contact and a reset contact. The integrator is connected to his own setting to zero arrangement 12.

The operation of said device is as follows:

The video signal from terminal 1 flows to the variable attenuator of tens 2, connected with an associated amplifier whose gain is automatically controlled by the automatic control circuit 3. This automatic control circuit 3 changes the gain of the amplifier 2 according to the amplitude of the input video signal, more exactly the gain of the amplifier associated in 2 is varied by an amount inversely proportional to the amplitude of the video signal. Filter 5 defines the band of frequency (KHz + 5 MHz) within which the device measures the noise level.

In the embodiment described in the drawing the use of two different cascade attenuators 2 and 6 is employed in order to divide amplification in two stages.

The square-law detector 7 gives an output signal proportional to the instant power of the input signal at any moment in time. Gate-circuit 8 extracts a voltage which is always proportional to the instant noise power in the interval in which it is measured. A signal is fed the gate-circuit 8 from the command pulse generator 4 in order to establish the desired time interval when the gate circuit is to extract a voltage proportional to the noise power. The output of said gate circuit is connected to the integrator circuit 9, whose output is in turn connected to the comparator 10.

Integrator 9 is cyclically set to zero so as to allow successive attempts to change attenuation, first in group 2 of tens, then in group 6 of units, so that the output from the integrator 9 approaches the threshold value pre-arranged in comparator 10.

Carrying out circuits, shown in FIG. 1, and having said working characteristics, does not present any difficulties for branch technicians.

Figure 2:
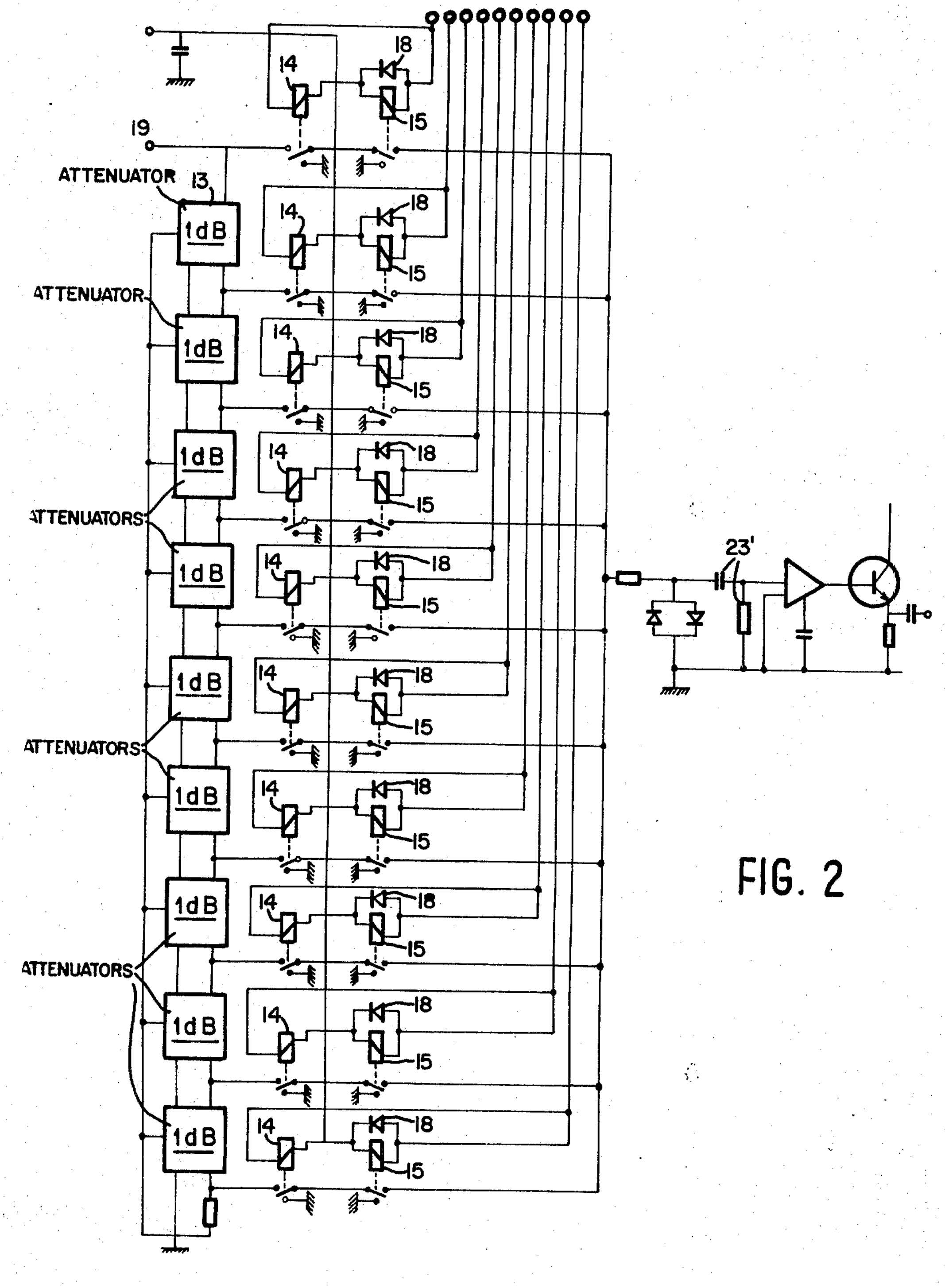
FIG. 2 is a schematic circuit diagram of the attenuator of the units and of the corresponding amplifier.
Figure 3:
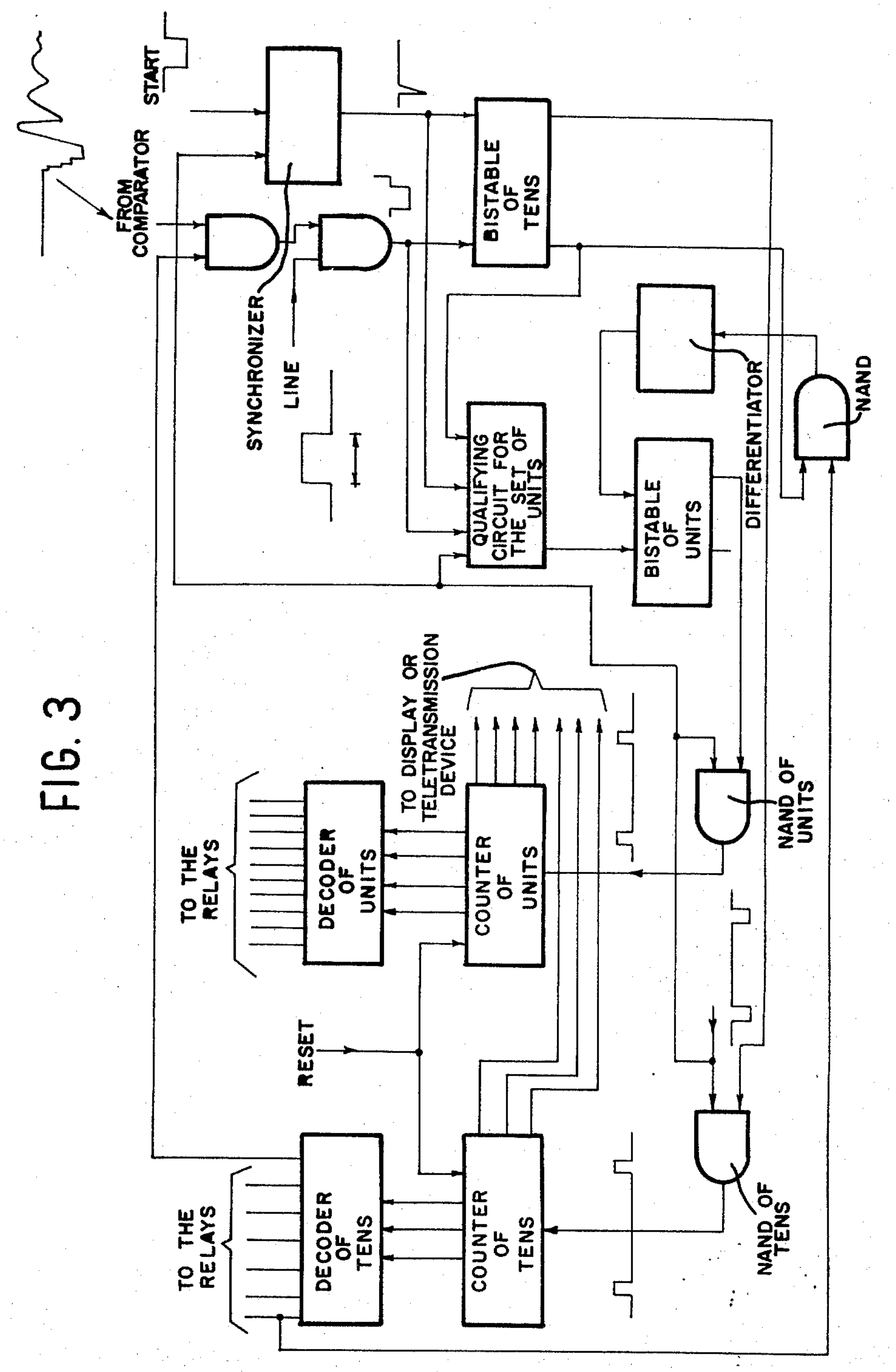
FIG. 3 is a schematic circuit diagram partly in block form of the logic circuit which controls the variable attenuators.

Nevertheless for completeness and in order to make easier comprehension of the invention, there is shown, respectively in FIGS. 2 and 3, a more detailed diagram of units attenuator 6 and a diagram of the logic which commands the attenuators 2 and 6.

Referring now to the drawing, in FIG. 2 are shown mine 1 dB attenuators, designated 13, each being connected to a pair of series connected relays 14 and 15; another pair of relays 16, 17 is connected in similar fashion, except that it is in a circuit in which there is no attenuator.

Across the terminals of one of each pair of relays, e.g., relay 15 or 17, is connected a damping diode 18. Input terminal is 19, output terminal is 20, said output terminal is connected to the attenuators associated amplifier 21. The driving terminals of the pairs of serially connected relays comprise 10 separate inputs, numbered from 0 to 9, connected with the outputs of the decoder group of the command logic 11.

Input of amplifier 21 is protected by two diodes connected in opposition 23, followed by a coupling CR network 23. At the output of amplifier 21 there is provided an impedance-matching transistor 24 feeding output terminal 25 which in turn is connected to the square-law detector 7.

It is appropriate to mention that the pairs of relays 14, 15 (and 16, 17) could be replaced with a single relay: nevertheless the use of a couple is preferable in order to eliminate the stray-capacitance effect.

Similarly the presence of diodes 18 is not indispensable; however, they are used for eliminating the over voltage effects produced by relay operation.

The command logic 11 of the device in the preferred embodiment is shown in FIG. 3.

A connection from comparator 10, through two NAND-gates 26 and 27 feeds a bistable circuit 28 of the tens and, through the switching circuit 29, feeds a bistable circuit 30 of units. The circuit 30 feeds a NAND-gate 31 of units, which drives the counter 32 of units tied to its associated decoder 33 whose output feeds the terminal-block 22 of the relays (see FIG. 2).

From the bistable 28 of tens there is a similar connection which through NAND-gate 34 of tens feeds the counter 35 of tens, tied to the decoder 36 of tens. The output of said decoder 36 is connected to a group of relays (not shown) similar to those of FIG. 2, with the exception that in this latter group of relays every attenuator-step controlled by said relays corresponds to 10 dB. These steps in the embodiment shown are only six because it is not necessary to introduce a total attenuation higher than 69 dB. Output designated 1 of decoder 36 is tied to a NAND-gate 37 which is also connected to the bistable of tens 28 whose output through a differentiator 38 goes to the bistable 30 of the units. The bistable of the tens receives the synchronizer of start instant 39.

Preferably the device according to the invention gets as video level reference the white level, which is present in the video signal as a bar of amplitude equal to 0.7 volt in comparison with the black level. Said bar is usually introduced in a determinate line of each field scan during the blanking interval by television broadcasters. More in detail, the way in which said white bar is employed in the device is the following: the amplitude of said bar is detected by the automatic control circuit 3 which varies the gain of the amplifier 2 by an amount inversely proportional to said amplitude as already stated.

However, it would also be possible to choose as video level reference the synchronizing signals level.

Preferably, the device measures the noise present in four particular lines of each field scan (for example the 11th, 12th, 13th, 14th) during the blanking time, in which the video signal is absent and the noise is present at the black level. However, it would be possible to carry out the measurement in a different number of lines and also out of the vertical blanking time, by measuring for example the noise present on the peak of the synchronizing signals.

In the above-mentioned case the gate 8 opens 4 times for 40 microseconds in correspondence with the lines during which measurement is carried out.

Let $A_{a10}$ be the attenuation of voltage in dB, introduced by the attenuator 2;$A_{al}$ the attenuation of voltage in dB, introduced by second attenuator 6; Ag the over-all voltage gain in dB of the amplifiers following the attenuators; $A_{Rq}$ the constant of square-law detector 7, that is the ratio in dB of the direct component of the output voltage to the square of the rms value of the input voltage (this ratio must be expressed in power dBs as here are involved quantities proportional to the square of the noise rms value); $A_{in}$ the ratio of the integrator 9 output voltage to the direct component of the input voltage. If $T_p$ equals 40 microseconds as the open-time of the gate and $T_i$ is the time constant of integrator 9, the gate opens four times in correspondence of the four measurement-lines, resulting in:

$$A_{in}=\log \frac{4T_p}{T_i}$$

The output of integrator 9 will give a signal which differs from the square of the rms value of the noise signal by an amount given by:

$$A_t = A_g + A_{Rq} + A_{in} - A_{a10} - A_{al}\ \text{dB}$$

The output of integrator goes to comparator 10 whose threshold has a value which has to be referred to the square of the nominal reference level which is 0.7 volt. Let $A_s$ be the ratio, in power dB, of the effective threshold S and the square of the reference value:

$$A_s = 10 \log \frac{S}{0.49}$$

(in the present device S = 0.8), in order to carry out the measurement, an adjustment of attenuators 2 and 6 is needed as the signal entering the comparator 10 is a little higher than the threshold value.

If this condition is verified, the signal-to-noise ratio is given by:

$$(S/N)_{dB} = A_G + A_{Rq} + A_{in} - A_{a10} - A_{al} - A_S$$

Let $A_G + A_{Rq} + A_{in} - A_S = 69$ (1)
and this is possible to be obtained by calibration (by adjusting $A_G$) so one readily obtains:

$$(S/N)_{dB} = 69 - A_{a10} - A_{al} \qquad (2)$$

Therefore, for example, the signal-to-noise ratio is 53 dB when the over-all attenuation $A_a10 + A_{al}$ is equal to 16 dB.

In said example it is convenient that the comparator be released when the signal-to-noise ratio decreases under 53.5 dB, therefore the indication +53 dB corresponds to an effective value between 53.5 and 52.5 dB. It is therefore appropriate that to verify range the following equality be used:

$$A_G + A_{Rq} + A_{in} - A_S = 69.5 \qquad (3)$$

while the measurement result is still given by (2).

Before starting the measurement, the attenuator of tens 2 is positioned on 50 dB and that of units on 0 dB. Correspondingly, the meter (not shown) indicates 19 dB which is the lowest limit of the meter range. Next, for each field scan comparator 10 output is surveyed and, if comparator is not released a 10 dB attenuation is excluded. When the comparator releases, the attenuator of units 6 enters upon working and is carried, in the field scan following first release of comparator, to the 9 dB position and than little by little to the 8 dB, 7 dB positions, till one again obtains a second release of the comparator. At this point the device stops and one may read the result indicated on said meter.

Assume a signal-to-noise ratio of 53 dB. During the first field scan in which one starts the measurement $$A_{a10} = 50\ \text{db} \qquad A_{a1} = 0\ \text{db}$$

therefore relationship (4) is not satisfied:

$$+53\ \text{dB} > 69.5 - 50\ \text{dB} - 0\ \text{dB}$$

and comparator does not release.

In the next field scans attenuation $A_{a10}$ is successively reduced, until in fifth field scan one has the following situation:

$$+53\ \text{dB} > 69.5 - 10\ \text{dB} - 0\ \text{dB}$$

At this point the comparator releases so as to render $A_{a10}$ constant from then on.

Similarly, attenuator $A_{a1}$ is carried, in sixth field scan, to the 9 dB position. As comparator does not release any more, in next field scans $A_{a1}$ is reduced, till in ninth field scan one has:

$$+53\ \text{dB} > 69.5 - 10\ \text{dB} - 6\ \text{dB}$$

At this point the device stops and one may read the display which indicates just + 53dB.

The situations in which signal-to-noise ratio is lower than 19 dB or higher than 69.5 dB are differently dealt with. In the first case, the comparator releases in the first field scan. The logic circuit, by detecting this situation, stops the device without the search for the units figure being carried out. Therefore, the 19 dB indication appears.

In the second case the search for the tens figure is unfruitful, as the comparator does not release; not even in the sixth field scan, when attenuation $A_{a10}$ takes the 0 dB value, corresponding to the figure 6 of tens. The logic circuit, by detecting this situation increases by one unit, in seventh field scan, the figure of tens and in the eighth field scan caries out the attenuator of units to 9 dB in order to have a 0 on the display in the range of units. The device stops and a 70 dB indication, which is the highest limit of the range, appears on the display.

The logic which commands the attenuator (FIG. 3) receives the following signals:

1. a signal composed by pulses, having the field scanning frequency (FIG. 3);
2. the "START" signal which starts every measurement cycle. It may be manually generated, or it may come from an external device. The "START" may arrive in any time but for proper working of the logic circuit it has to be synchronized, i.e., has to be transformed into a narrow negative pulse whose descending front coincides with the descending front of a pulse according to point (1) above;
3. the "Reset" signal which returns the counters 32 and 35 to their initial position at the end of the measurement cycle. This signal may be manually generated or may be supplied by an external device;
4. the pulse generated by the comparator in response to an input exceeding the pre-selected threshold value. Comparator output is normally high (logic value 1); the pulse corresponding to the release is low (logic value 0);
5. a signal flowing to the NAND-gate 27 which is a positive pulse which lasts from the 11th to the 22nd line in the odd field scan and from 324th to 335th line in the even field scan (therefore 640 microseconds long), and which allows the passage of pulses produced by the comparator circuit only in the integration interval. In fact, the comparator might also release in response to oscillations produced in the integrator circuit. Therefore, these spurious pulses must obviously be eliminated.

Counter 35 of tens is composed of three bistables and counts up to 7 in purely binary code. Counter 32 of units is composed of four bistables and counts in purely binary code up to 9. The figures produced by these counters are decoded and the outputs of the decoders drive the relays of the attenuators.

At the beginning of the measurement cycle the two counters are set on position 1 and position 9. At the same time the attenuator of tens is in the position 50 dB and that of units on 0 dB, If the comparator does not release in first field scan it is necessary to reduce attenuation $A_{a10}$ by 10 dB at each following scan, till first release of a comparator is obtained. For that reason it is necessary to send pulses to the counter of tens, which so counts them, until comparator releases.

After first release of comparator the pulses to the counter of tens are stopped and pulses are then sent to the counter of units, whose decoder at the first pulse goes to the position 0, which corresponds to 9 dB of attenuation and, at the next pulse goes to the positions 1,2,3 . . . successively until the next release of the comparator which stops the device.

Therefore, the signal 1 is sent to the counters through two gates (NAND-circuits 34 and 31 of tens and of units) which open, one between the "start" and the first release of comparator, the other between the first and the second release of comparator.

The qualifying signals for the gates are supplied by two bistables of the "set-reset" type, (respectively bistables of tens 28 and of unit 30) which have the function of recording the measurement stage in which one is.

The bistable of tens is carried out of "re-set" position by the negative front of the "start" signal synchronized with the signal (1) (described above) and into "set" position by the negative pulse coming from the comparator. This pulse gets to the bistable of tens through two NAND-gates 26 and 27. Each NAND-gate has two input terminals. To one input terminal of NAND-gate 27 there is applied a pulse corresponding to the measurement-lines and has the said function (5). To one input terminal of NAND-gate 26 there is applied the output position 7 from the decoder of tens, whose function will now be explained.

The bistable of units, in the meantime, is carried to, "reset" position, when the bistable of tens goes back to "set," and is then driven to "set" by the second release of the comparator by the switcher 29.

The switcher prevents also an irregular working of the bistable of units, in response to the first release of the comparator circuit. In fact, without its presence, in the last mentioned circumstances, a signal would be present both at the "set" and "reset" inputs. This circuitry allows the passage of the pulse produced by the comparator only in the field scan following that in which a first release of the comparator had occurred.

The operation of the logic circuit is slightly different in the cases of signal-to-noise ratio $\leq$ 19 dB or $\geq$ 70 dB.

In the first cases, when the "start" signal comes, in the field of scan which immediately follows the comparator releases and carries again in "set" the bistable of tens which stops sending pulses (1) by gate 34 to the counter of tens and the output of the decoder of tens (with logic value 0) remains on 1. In order to prevent the counter of units from starting and carrying the output of respective decoder which is on 9 position (with logic value 0) there is the NAND-gate 37, which connects the bistables of tens and that of units, and in one of its two inputs receives the output of the decoder of tens. This output, as compared to the others, is always high (logic value 1) except when the counter of tens is in the 001 position.

When output Q of the bistable of tens becomes high (logic value 1) a negative pulse would arrive to the "reset" of the bistable of units, but in this case it would be blocked by the NAND-gate 37, whose input tied to the decoder of tens has the logic value 0. Therefore, the device stops on the 19 dB position.

Signal-to-noise ratio > 19 dB and < 70 dB (for example 45 dB)

When the "start" signal arrives, the bistable of tens goes to reset and the NAND-gate of tens 4 allows the passage of pulses (1) which are applied to the counter which starts counting. When, i.e., at the fourth field scan, decoder is placed on the FIG. 4 (20 dB of attenuation) the comparator releases, the bistable of tens goes to the set position and stops the counter of tens.

Simultaneously, through NAND-gate 37 the bistable of units goes to reset, and the switcher circuit qualifying for the set of units 31 prevents a signal from flowing also to the set input, at first release of comparator circuit.

Therefore the NAND-gate of units allows the passage of pulses (1) to the associated counter whose counting stops, i.e., when, in response to the position 4 of said decoder, the comparator releases again and carries again to the set position the bistable of units, so that the counter stops and one may read the display which indicates 45, satisfying equation (2), $$(S/N) = 69 - 20 - 4 = 45$$

In the case of signal-to-noise ratio $\geq$ 70 dB, after a "start" signal arrives, the comparator does not release, even in the sixth field scan (position 6 of the tens). The counter of tens makes its decoder go to position 7 in the seventh field scan. This output position is not connected to a relay, but enters the NAND 26, together with the output of the comparator. A low signal in position 7 has the same effects as the release of the comparator. Therefore, reached in the seventh field scan the FIG. 7, the counter of units carries its own decoder to the output 0 and stops there as if the comparator had released again. The device stops and one obtains the measurement indication of 70 dB at the meter.

The "reset" signal sets the counters so, as to obtain the positions 1 and 9 at the output of the decoder, the device is then ready to start a new measurement cycle at a next "start" signal.

The present invention has been explained and described with reference to the preferred embodiment thereof and with short account of some variants, but it is intended that other variants and modifications are possible without departing from the spirit and scope of the invention as set forth in the claims appended hereto.

So, by way of example, though the description indicated a measurement interval between 19 dB and 70 dB, it is easily possible to change these limits.

It has already been said that instead of measuring the signal-to-noise ratio by referring to the noise present on four lines during the blanking time of each field scan (for example the 11th, 12th, 13th, 14 th one might extract the noise on one or several lines or on part of them, other than during the vertical blanking time. It is also evident that in order to keep into account the variations of the video signal amplitude one might, by way of example, automatically vary the time constant of the integrator; a third solution could be to keep unvaried the time constant of the integrator, and on the contrary to vary successively the threshold value of the comparator. Though indication of signal-to-noise ratio is more convenient, in a variant one might measure the noise absolute value, so making unnecessary any of the three proposed solutions.

As to the logic system which automatically places in position the attenuators, supplying the reading of the signal-to-noise ratio in binary numerical system which, decoded, indicates with first figure the value of tens and with second figure the value of units, it is evident that one may use a code different from the said 8 – 4 – 2 – 1 code. The indicated logic may be replaced with a different equivalent logic, both for the position of the attenuators and for the indication of the values out of the measurement range. It is also evident that the indication may be supplied by more than two figures.

What we claim as new and desire to secure by Letters Patent of the United States is:

1. A process for the automatic measurement of signal-to-noise ratio of television signals comprising the steps of: extracting the noise from the transmitted signal, in one or more intervals, in which video signal contains no image information; amplifying said noise by an amount inversely proportional to the amplitude of a white bar, assumed as a measure of video-signal amplitude, introducing said noise into variable attenuators, detecting said noise, integrating the output of the detector of said noise during said intervals, comparing the output of said integrator with a fixed reference level, and automatically switching said attenuators, on or off, until the output of the integrator operating said integration becomes equal to said reference level, deducing the value of signal-to-noise ratio from the amount of attenuation introduced, and displaying said value.

2. A process for the automatic measurement of signal-to-noise ratio of television signals, comprising the steps of: extracting the noise from the transmitted signal, in one or more intervals, in which video signal contains no image information; amplifying said noise by a fixed amount, introducing said noise into variable attenuators, detecting said noise, integrating the output of the detector of said noise during said intervals changing automatically the time constant of the integrator operating said integration, to an amount proportional to the amplitude of a white bar assumed as a measure of the video signal amplitude, comparing the output of said integrator with a fixed reference level, and automatically switching said attenuators, on or off, until output of the integrator operating said integration becomes equal to said reference level, deducing the value of signal-to-noise ratio from the amount of attenuation introduced, and displaying said value.

3. A process for the automatic measurement of signal-to-noise ratio of television signals, comprising the steps of: extracting the noise from the transmitted signal, in one or more intervals, in which video signal contains no image information; amplifying said noise by a fixed amount, introducing said noise into variable attenuator, detecting said noise, integrating the output of the detector of said noise during said intervals, comparing the output of said integrator with a reference level proportional to the amplitude of a white bar assumed as a measure of video signal amplitude and automatically switching said attenuators, on or off, until the output of the integrator operating said integration becomes equal to said reference level, deducing the value of signal-to-noise ratio from the amount of attenuation introduced, and displaying said value.

4. A process for the automatic measurement of signal-to-noise ratio of television signals, comprising the steps of: extracting the noise from the transmitted signal, in one or more intervals, in which video signal contains no image information; amplifying said noise by an amount inversely proportional to the amplitude of synchronizing pulses associated to the video signal, assumed as a measure of video-signal amplitude, introducing said noise into variable attenuators, detecting said noise, integrating the output of the detector of said noise during said intervals, comparing the output of said integrator with a fixed reference level, and automatically switching said attenuators, on or off, until the output of the integrator operating said integration becomes equal to said reference level, deducing the value of signal-to-noise ratio from the amount of attenuation introduced, and displaying said value.

5. A process for the automatic measurement of signal-to-noise ratio of television signals, comprising the steps of: extracting the noise from the transmitted signal, in one or more intervals, in which video signal contains no image information; amplifying said noise by a fixed amount, introducing said noise into variable attenuators detecting said noise, integrating the output of the detector of said noise during said intervals changing automatically the time constant of the integrator operating said integration, to an amount proportional to the amplitude of synchronizing pulses associated to the video signal assumed as a measure of the video signal amplitude, comparing the output of said integrator with a fixed reference level, and automatically switching said attenuators, on or off, until the output of the integrator operating said integration becomes equal to said reference level, deducing the value of signal-to-noise ratio from the amount of attenuation introduced, and displaying said value.

6. A process for the automatic measurement of signal-to-noise ratio of television signals, comprising the steps of: extracting the noise from the transmitted signal, in one or more intervals, in which video signal contains no image information; amplifying said noise by a fixed amount, introducing said noise into variable attenuators, detecting said noise, integrating the output of the detector of said noise during said intervals, comparing the output of said integrator with a reference level proportional to the amplitude of synchronizing pulses associated to the video signal assumed as a measure of video signal amplitude and automatically switching said attenuators, on or off, until the output of the integrator operating said integration becomes equal to said reference level, deducing the value of signal-to-noise ratio from the amount of attenuation introduced, and displaying said value. 7. A process for the automatic measurement of the noise of television signals, comprising the steps of: extracting the noise from the transmitted signal, in one or more intervals, in which video signal contains no image information; amplifying said noise by a fixed amount, introducing said noise into variable attenuators, detecting said noise, integrating the output of the detector of said noise during said intervals, comparing the output of said integrator with a fixex reference level and automatically switching said attenuators, on or off, until the output of the integrator operating said integration becomes equal to said reference level, deducing the value of the noise from the amount of attenuation introduced, and displaying said value.

8. A process according to claim 1, wherein the step of switching attenuators on and off is repeated in cyclic fashion during each field scan of the television signal.

9. A device for the automatic measurement of signal-to-noise ratio of television signals, comprising at least one group of attenuators which may be sequentially switched on and off by means of appropriate fast-acting relays, arranged in cascade and interconnected by at least a wide-band amplifier, said attenuator group being connected to a square-law detector which in turn is serially connected to a gate circuit for the extraction of the noise signal from pre-selected portions of the signal, said gate circuit being driven by a pulse generator, an circuit for integrating the output of said gate and means for setting said integrator to zero at each field scan, and a comparator circuit for comparing the noise power with a preselected reference level, the output of said comparator being connected to a logic circuit which commands the automatic sequential switching of said attenuators until the reference value is reached.

10. A device according to claim 9, comprising two groups of attenuators, one corresponds to the tens of decibels and the other to the units.

* * * * *